Dec. 20, 1960   P. M. J. M. R. DAIGNAS   2,965,306
PORTABLE POWER-DRIVEN COATING MACHINE
Filed May 27, 1960   4 Sheets-Sheet 1

Dec. 20, 1960   P. M. J. M. R. DAIGNAS   2,965,306
PORTABLE POWER-DRIVEN COATING MACHINE
Filed May 27, 1960   4 Sheets-Sheet 2

Dec. 20, 1960   P. M. J. M. R. DAIGNAS   2,965,306
PORTABLE POWER-DRIVEN COATING MACHINE
Filed May 27, 1960   4 Sheets-Sheet 3
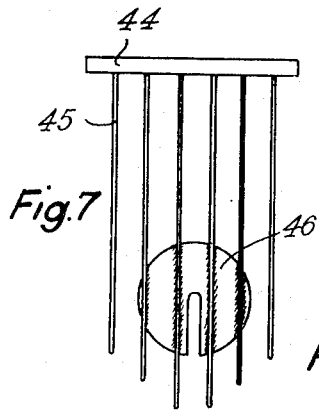
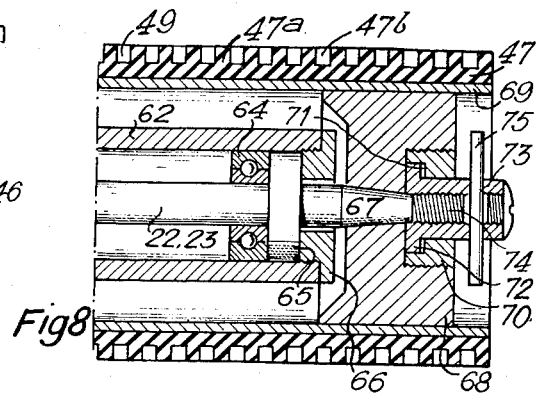
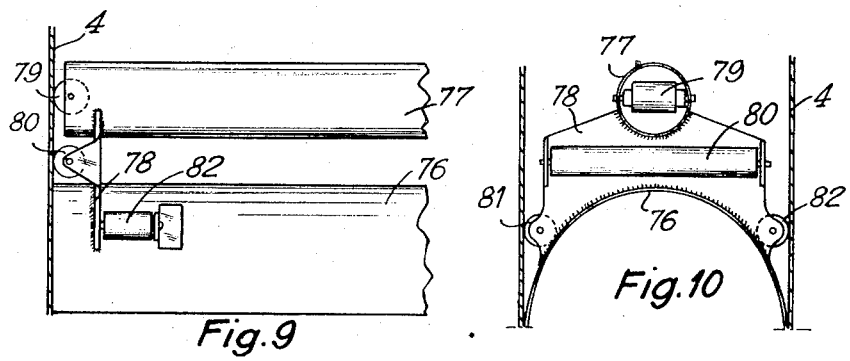

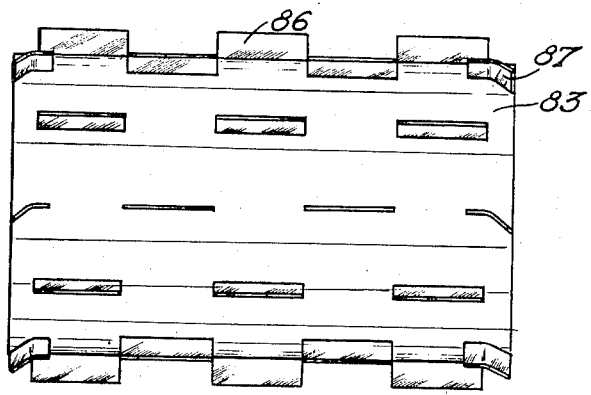
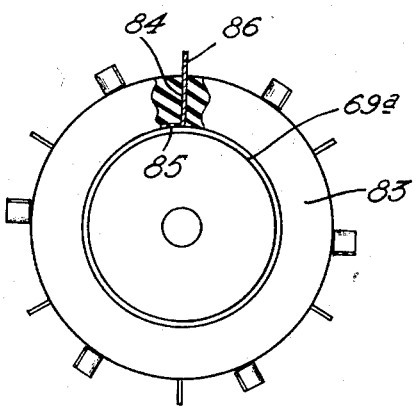
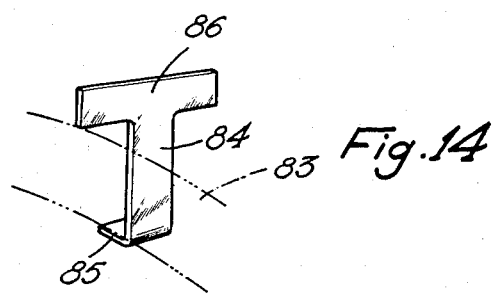

United States Patent Office 2,965,306
Patented Dec. 20, 1960

2,965,306

PORTABLE POWER-DRIVEN COATING MACHINE

Pierre Michel Jean Marie Raymond Daignas, 10 Rue Boissy d'Anglas (Alpes Maritimes), Nice, France Filed May 27, 1960, Ser. No. 32,451

Claims priority, application France June 1, 1959

23 Claims. (Cl. 239—215)

The coating of construction walls, using mortar for example, has hitherto been accomplished by the use of a trowel to project the mortar on to the wall prior to smearing, or by projection machines incorporating a hand-driven rotating member.

The present invention has for its object a portable coating machine characterized by the fact that it is driven by an incorporated electric motor or by a motor of any type placed at a distance and connected by a flexible drive, and that it comprises, in combination, a single transmission shaft carried by the machine, driven by the motor and simultaneously driving two centrifugal superposed projection rotors which rotate in opposite directions with a gap in between them, a screw conveyor conveying the coating material from the machine container to the gap separating the two rotors, means for upwardly and downwardly limiting the spray of coating material from the rotors and which at the same time act as reclaimers, a components for sifting and regulating the supply of coating material between the screw conveyor and the rotors and means enabling the machine to be operated in the vertical position.

Further particularities of the invention will become apparent from the description which follows, with reference to the accompanying drawings given by way of example only and not in a limiting sense, and which will give a clear understanding of how the invention may be performed. In the drawing:

Fig. 7 is a front view of the grid for sifting and regulating the supply.

Fig. 8 is a view on a larger scale of the method of fitting a projection rotor.

Figs. 9 and 10 are lateral and front views respectively of the cover which enables the machine to be used for vertical projections.

Figs. 12 and 13 are lateral and front elevations respectively, with partial cutaway, of another embodiment of a rotor for a coating machine according to the invention.

Fig. 14 is a perspective view on a larger scale of one of the blades of the rotor in Figs. 12 and 13, the rubber lining into which the blade is anchored being assumed to be transparent.

Figure 1:
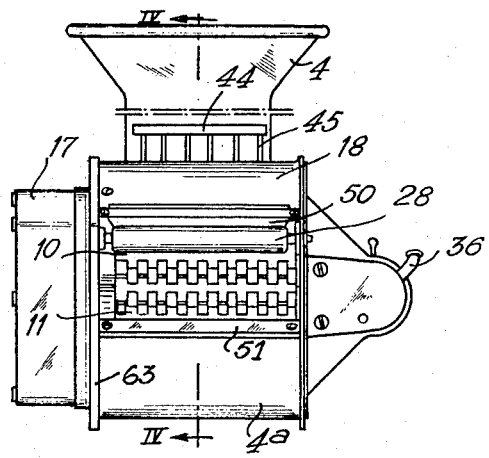
Fig. 1 is a front view of the machine.
Figure 2:
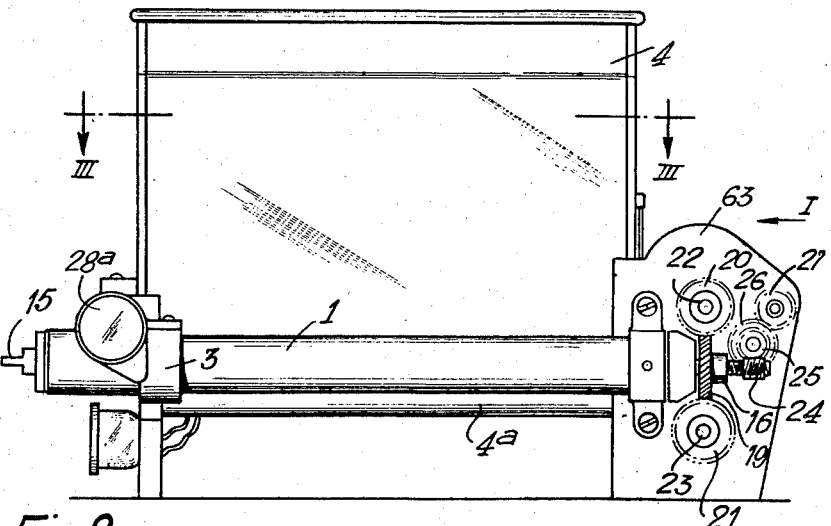
Fig. 2 is a lateral view of the machine, showing the general transmission side after removal of the casing protecting the rotor drive system.

In the embodiment shown in the drawings, the machine comprises two prehension arms 1 and 2 consisting of two tubular parts fixed to the hollow body 3 of the machine. This hollow body acts as a reservoir 4 to contain the coating material to be projected, and in the cylindrical trough 4a of this reservoir is axially mounted a screw conveyor 5 consisting of a shaft 6 to which is secured, through the medium of arms 7, a strip of metal 8 formed into a hollow screw, the width of this strip increasing progressively from the rear towards the front of the machine. The axis of the trough is parallel to the prehension arms. This screw acts as a feed screw and conveys the material from the rear towards the front and then causes it to pass through an aperture 9 provided in the front wall of the reservoir 4 in axial relation with the trough axis, the purpose being to feed the gap provided between two superposed projection rotors 10 and 11 rotated in opposite directions about axes at right angles to the trough axis and which project the coating material under the effect of centrifugal force.

Figure 3:
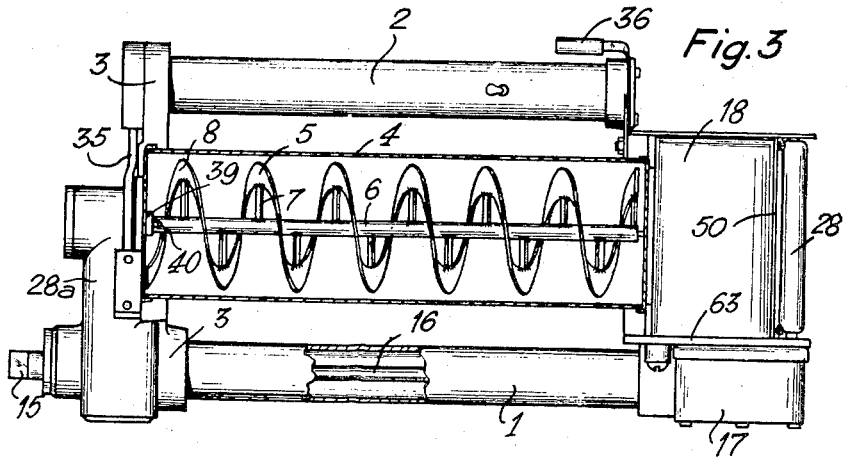
Fig. 3 is a plan view, with partial cutaway, of the machine illustrated in Figs. 1 and 2.
Figure 11:
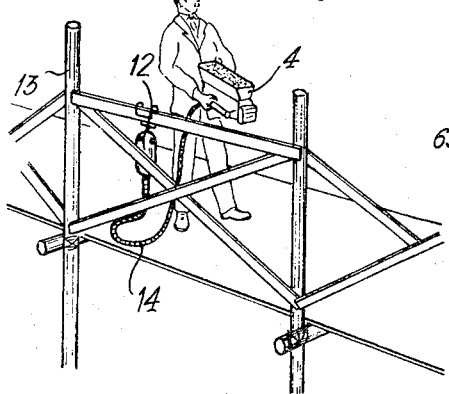
Fig. 11 is a diagrammatic illustration of a method of utilizing the machine.

The drive to the rotating components of the machine, namely the screw 5 and the rotors 10 and 11, is provided by an incorporated electric motor, for example in the rear part of the prehension arm 1 and connected to a main transmission shaft 16 enclosed in said prehension arm 1 (Fig. 3), or by a motor of any type 12, electrically or petrol-driven, secured in any known manner to any point on the guard-rail of a scaffolding or placed on the ground and connected via a flexible drive 14 to a screwdriver-type driving tongue 15 secured on the main transmission shaft 16 (Figs. 11 and 3).

Near the end of this shaft 16, in a lateral casing 17 attached to the side of the casing 18 housing the two rotors, is mounted a spiral gear 19 which meshes with two further spiral gears 20 and 21 perpendicular to the first and respectively keyed to the drive shafts 22 and 23 of the rotors 10 and 11. This shaft 16 carries, at its end, a worm 24 meshing with a pinion 25 which, through the medium of a reduction train 26 and 27, drives a roller 28 arranged in front of the upper rotor 10 at a level below that of the rotor axis 22 and whose operation will be explained hereinafter.

On the shaft 16, housed in a rear gear-casing 28a, is keyed a worm 29 which meshes with a spiral wheel 30 secured on a hollow shaft 31 terminating in dog-clutch teeth 32 and carried by a countershaft 33. On the countershaft 33 are mounted dog-clutch teeth 34 which can be made to engage the teeth 32 under the action of a fork (not shown) operated by a transmission system 35 which is in turn actuated by an engagement lever 36 in conjunction with suitable transmission means.

On the countershaft 33 is keyed a bevel pinion 37 which meshes with a bevel pinion 38 carried by a shaft 39. This shaft 39 is provided with pins 40 which penetrate into apertures made in the shaft 6 of the screw conveyor 5 for the purpose of driving the latter and at the same time ensuring ease of replacement. To this end, the extremity of the shaft 6 terminates in a point 41 which penetrates into a rubber block tight fitted into an enclosure 42 carried by transverse arms 43 which are hinged on the lateral walls of the reservoir 4 about a horizontal transverse axis. By thrusting the shaft 6 against this rubber block the apertures can be disengaged from the pins 40, and by then swivelling the enclosure 42 about the arms 43 it is possible to withdraw the screw from the reservoir 4 and replace it with a screw of different pitch.

Before the orifice 9, through which the material contained in the reservoir is conveyed by the screw towards the rotors, is arranged a safety grid consisting of a support 44 on which are fixed bars 45 the number of which is determined according to the flow to be obtained through the grid, the latter at the same time providing a form of safety sifting. On the portion of the grid which passes over the end 41 of the shaft 6 it is possible to fix a screen 46, the diameter of which may or may not be equal to that of the hollow part of the screw, to oppose passage of the material and thus reduce the quantity delivered only in relation with the central hollow portion of the screw 5, in order to avoid a water extraction effect which would result in a compact mass liable to damage the screw blade.

Figure 4:
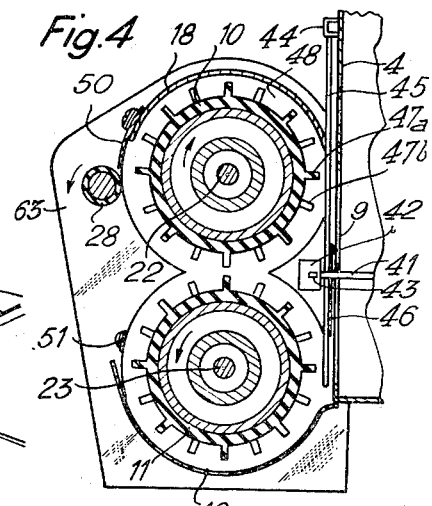
Fig. 4 is a sectional view of Fig. 1, on a larger scale, taken along the line IV—IV in the area of the rotors.
Figure 5:
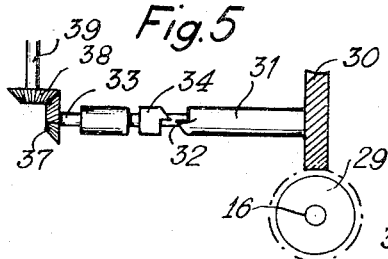
Fig. 5 is a highly schematic illustration of the drive system for the spiral conveyor.

As shown in Figs. 4 and 8, each rotor comprises an outer lining 47 which is made of some flexible material like natural or synthetic rubber and which is provided with longitudinal rows of teeth 47a and 47b which leave between them longitudinal hollows 48 and diametrical hollows 49 which are designed to ensure prehension of the material penetrating into the projection path under the thrust exerted by the screw. The width of these teeth will depend upon the degree of pulverization required. The teeth are staggered as shown at 47a and 47b in Fig. 4, so that there should be no neutral area existing in any diametrical plane, the material being thus evenly divided for projection over the frontal plane.

The spray of material provided by the rotors 10 and 11 is limited both upwardly and downwardly. The upwardly limitation is obtained by the roller 28 which is driven at reduced speed and which acts as a limiting and reclaiming component. This roller is associated to a flexible blade 50 which acts as a scraper to strip the roller 28 of the material projected on it by the rotors 10 and 11. The roller 28 rotates in the opposite direction to the rotor 10, at a speed sufficient to prevent adhesion of the material on the roller from being countered by the effect of gravity. The material collected off the roller 28 by the blade 50 is then taken up by the rotor 10 and returned by it into the projection path.

The downwardly limitation for the spray is obtained by means of a blade 51 arranged in front of the bottom rotor 11, with its upper edge at a level above that of the rotor axis 23. The material which is deposited on this blade is recovered by dripping into the bottom of the casing 18 surrounding the rotors.

The machine described above is portable and easy to handle. It allows coatings to be made over large areas in a very short time, and these coatings may be made with mortar, with products containing asphalt, with bituminous products, with fibrous paints or with other products. The machine output can be modified by changing the feed screw which, for a reduced pitch, will give a lower output. The output can also be adjusted by changing the safety grid.

Figure 6:
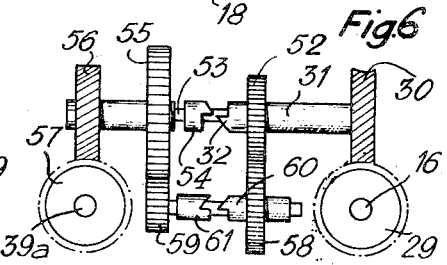
Fig. 6 is a highly diagrammatic illustration of a drive system for the spiral conveyor, incorporating a gear-change feature.

In order to instantly vary the output without interrupting the projection of material, the machine could be equipped with a gear-change feature of the type illustrated in Fig. 6. Through the worm 29, the transmission shaft 16 drives the spiral wheel 30 keyed to the hollow shaft 31 which is provided with dog-clutch teeth 32. On this shaft is also keyed a pinion 52. This hollow shaft serves to house a countershaft 53 on which are fixed dog-clutch teeth 54 designed to mesh with the teeth 32. On the countershaft 53 are keyed a pinion 55 and a spiral wheel 56 meshing with a spiral wheel 57 keyed on the shaft 39a driving the feed screw. The pinions 52 and 55 mesh respectively with two pinions 58 and 59 mounted on a common secondary countershaft and capable of being coupled together by a dog-clutch 60—61. It is thus possible, by means of two levers for operation of the dog-clutches 32—54 and 60—61 to drive the shaft 39a at different speeds, in one case by providing direct drive between the shafts 31 and 53 via the dog-clutch 32—54 and with the dog-clutch 60—61 disengaged, and in the other case by providing direct drive between the pinions 58—59 via the dog-clutch 60—61, the dog-clutch 32—54 being then disengaged.

In order to ensure correct fixing of each rotor on its shaft and easy dismantling of that rotor, recourse is had to the assembly method shown in Fig. 8. The shaft 22 or 23 of the projection rotor is supported by a tubular piece 62 fixed to the side 63 of the rotor casing, and the drive passes through this tubular piece 62. Within the latter the shaft is mounted at each end by means of ball-bearings 64 and seals 65. At its free end, the tubular part 62 is provided with a plug 66. Beyond the tubular piece 62 the shaft is extended into a tapered seating 67 over which fits a capping-piece 68 which is secured, in any manner well-known per se, on the rotor rim 69 to which is fitted the elastic projection lining 47. This capping-piece 68 is provided, on its side opposite the tubular piece 62, with a recess the lateral wall of which is tapped to take a threaded piece 70 provided with a recess 71. In this recess 61 is arranged, with a slight degree of axial play, the seating 72 of a nut 73 which screws on the threaded end 74 of the shaft 22 or 23 through the medium of a strip 75.

When it is desired to fit the rotor to its shaft, one first fits the tapered seating 67 into the capping-piece 68 by pulling it in by the action of the nut 73 the seating 72 of which bears against the capping-piece; in this way one ensures correct centering of the rotor in this tapered seating. To dismantle the rotor, the nut 73 is unscrewed. Its seating 72 then comes into contact with the threaded piece 70 and the whole then acts as a hub extractor to separate the capping-piece 68 from the tapered end 67.

The teeth of the rotors according to Fig. 4 may not give the desired optimum efficiency in all circumstances, the teeth being too wide in the direction of rotation so that they squeeze the mortar between smooth, non-prehensile parts; in addition, such teeth may wear out rapidly.

In the embodiment shown in Figs. 12 to 14, on the rim 69a of the rotor is mounted a cylindrical liner 83 made of flexible material such as natural or synthetic rubber. This liner can be in one piece or can be formed of successive rings of identical thickness mounted edge to edge on the rim 69a. Into this liner 83 are made longitudinal rows of cuts parallel to the axis of the rotor, right through the thickness of the liner, arranged at a distance from one another in each row and staggered from one row to the next.

Into these cuts are mounted T-shaped blades made of stainless rolled and cold-hammered steel, the legs 84 of which, after penetrating into the cuts, the length of which is the same as the width of the legs, are bent back at right angles at 85 underneath the liner in order to anchor the blades in position. The cross-pieces 86 of the blades protrude above the outer surface of the liner 83 and thus act as projection teeth for the rotor. From one longitudinal row to the next, these teeth are staggered and cover, in two rows, the whole length of a generating line of the rotor. The cross-pieces of the blades arranged along the edge of the rotor are bent forward in the shape of helix portions into the direction of projection, as shown at 87 in Fig. 12, the purpose being to reduce lateral dripping and to keep the mortar within the field of projection of the rotors.

This arrangement ensures improved delivery, longer life for the teeth and ease of replacement of the latter. It also allows less energy to be wasted. In addition, pebbles up to walnut size, which may have become accidentally incorporated in the mortar to be projected, will pass between the two rotors more easily.

The machine as described hitherto can be used only for projections in a substantially horizontal direction. It may however be necessary to effect a vertical projection of some coating substance on a horizontal surface, the projection of mortar on an overhanging feature such as a balcony being an example. To allow the machine to be used in this way, a cover of the type shown in Figs. 9 and 10 is used which fits into the reservoir 4. This cover consists of a plate 76, curved to the radius of the trough 4a, which just touches the sides of the reservoir 4 and which is provided with a handling and withdrawing device in the shape of a handle 77 fixed to the plate 76 by means of a suitable fitting 78. When the operator wishes to make a vertical projection, he pushes this cover into the reservoir 4 and, by acting on the handle 77, thrusts it on the mortar contained in the reservoir until the curved plate 76 comes into contact with the rounded trough 4a of the reservoir; the latter thus being transformed into a perfect cylinder. The cover can then be removed to refill the reservoir with material for projection.

In order to avoid possible jamming of the cover when it is being displaced, the handle 77 and each fitting 78 are provided with transverse rollers 79 and 80 which bear against the transverse walls of the reservoir 4. Similarly, the fittings 78 carry, at each end of the cover, two longitudinal rollers 81 and 82 which bear against the sides of the reservoir.

Clearly, many modifications can be made to the embodiments described hereinabove without departing from the scope of the invention as defined in the appended claims. As an example, the screen 46 of the grid may be of different size to the internal dimensions of the hollow feed screw or may be of a shape different to that illustrated. Similarly, the external part 47 of the rotors, instead of being produced in one piece, may be constituted of a multiplicity of rings provided with teeth 47a and 47b and mounted side by side on the rim 69 of the rotor.

Similarly, instead of forming one piece with the side walls of the reservoir, the trough 4a may be constituted in the form of a removable component, made of metal or some flexible material such as natural or synthetic rubber or plastic material, in order to enable it to be replaced in the event of wear through erosion.

What I claim is:

1. A portable coating machine comprising, in combination, a hollow body acting as a reservoir for the coating material and having a cylindrical bottom wall forming the trough of said reservoir and a front wall with an aperture centered on the axis of said cylindrical trough, two hollow prehension arms parallel to the trough axis and secured on either side of said hollow body, two centrifugal superposed projection rotors the axes of which are at right angles to the trough axis, said rotors being rotatable in opposite directions and mounted on said body in front of said front wall for defining between them a gap at the level of the trough axis, a rotatable screw conveyor coaxial with, and housed within, said cylindrical trough for conveying the coating material from said trough to said gap, means for rotatably mounting said screw conveyor within said trough, a single transmission shaft housed within one of said hollow prehension arms, a motor means, means for drivingly connecting said motor means to said transmission shaft, means for drivingly connecting said transmission shaft to said screw conveyor and to both rotors, means for upwardly and downwardly limiting the spray of coating material from the rotors and which at the same time act as reclaimers, means for sifting and regulating the supply of coating material between the screw conveyor and the rotors, and means enabling the machine to be operated in the vertical position, when required.

2. A portable coating machine, according to claim 1, wherein the means for rotatably mounting the screw conveyor within the trough comprises means for connecting in a disconnectable manner the rear part of said screw conveyor with the drivingly connecting means from the transmission shaft and carried by the rear wall of the hollow body, an enclosure centered on the trough axis and disposed in front of the body front wall, transverse arms carrying said enclosure and hinged on the lateral walls of said body about a horizontal transverse axis, and a rubber block tight fitted into said enclosure and carrying the front part of said screw conveyor, whereby said screw conveyor may be withdrawn and replaced with a screw conveyor of different pitch.

3. A portable coating machine, according to claim 1, wherein the means for drivingly connecting the transmission shaft to the screw conveyor comprises a first spiral wheel carried by said transmission shaft, a hollow shaft at right angles to said transmission shaft, a second spiral wheel carried by said hollow shaft and in meshing engagement with said first spiral wheel, a countershaft centered within said hollow shaft, a train of gears connecting the screw conveyor and said countershaft, and a clutch device for connecting said hollow shaft and countershaft.

4. A portable coating machine, according to claim 1, wherein the means for drivingly connecting the transmission shaft to the screw conveyor comprises a first spiral wheel carried by said transmission shaft, a hollow shaft at right angles to said transmission shaft, a second spiral wheel carried by said hollow shaft and in meshing engagement with said first spiral wheel, a countershaft centered within said hollow shaft, a train of gears connecting the screw conveyor and said countershaft, and a clutch device for connecting said hollow shaft and countershaft, a second hollow shaft parallel to the first one, a train of gears interconnecting said hollow shafts, a second countershaft centered within said second hollow shaft, a train of gears interconnecting the two countershafts, and a second clutch device for connecting said second hollow shaft and second countershaft.

5. A portable coating machine, according to claim 1, wherein the means for drivingly connecting the transmission shaft to both rotors comprises a spiral wheel carried by said transmission shaft, and two spiral wheels at right angles to, and in meshing engagement with, said first spiral wheel and respectively fixed to said rotors.

6. A portable coating machine, according to claim 1, wherein the means for upwardly limiting the spray of coating material from the rotors comprises a roller rotatably mounted on the lateral walls of the body in front of the top rotor at a level below that of the axis of said rotor, a reduction unit carried by one of said lateral walls and interconnecting the transmission shaft and said roller so that the latter rotates in the opposite direction to the rotary direction of said top rotor, and a flexible transverse blade carried by the body, disposed between said top rotor and said roller and acting as a scraper for said roller.

7. A portable coating machine according to claim 1, wherein the means for downwardly limiting the spray of coating material from the rotors comprises a transverse blade carried by the body in front of the bottom rotor, the upper edge of said transverse blade being at a level above that of the bottom rotor axis.

8. A portable coating machine, according to claim 1, wherein the means for sifting and regulating the supply of coating material between the screw conveyor and the rotors comprises a safety grid interposed between the output of the screw conveyor and the rotors in front of the aperture of the front wall.

9. A portable coating machine, according to claim 1, wherein the means enabling the machine to be operated in vertical position comprises a removable semi-cylindrical cover to be inserted within the body and the diameter of which is substantially equal to that of the trough, a longitudinal handle secured on the top of said cover, and transverse and longitudinal rollers pivotally mounted on said cover and handle for facilitating the displacement of said cover into said body by rolling engagement with the lateral, front and rear walls of said body.

10. A portable coating machine, according to claim 1, wherein the screw of the conveyor is hollow and comprises a central shaft, a metal strip formed in the shape of a helix at a distance from, and around, said shaft and the width of which increases from the end of said shaft opposite the rotors up to the other end of said shaft adjacent to the rotors, and radial arms securing said metal strip to said shaft.

11. A portable coating machine, according to claim 1, wherein each rotor comprises a rotor shaft, a rim, means for fixing said rim on said rotor shaft in a dismountable manner, an outer lining carried by said rim and made of flexible material, and longitudinal rows of teeth protruding from said lining and arranged in staggered relationship from one row to the next.

12. A portable coating machine, according to claim 11, wherein the means for fixing the rim on the rotor shaft comprises a device for taper location interconnecting said rim and shaft for centering said rim on said shaft, and an extractor mounted on the end of said shaft in contact engagement with said device and operating after the fashion of a hub-extractor.

13. A portable coating machine, according to claim 11, wherein the outer lining of flexible material is integral with the longitudinal rows of teeth.

14. A portable coating machine, according to claim 11, wherein each tooth is cut from a thin metallic material resistant to wear and oxidation and is anchored in the outer lining of flexible material.

15. A portable coating machine, according to claim 14, wherein each tooth is cut from thin stainless rolled and cold-hammered steel plate.

16. A portable coating machine, according to claim 14, wherein the outer lining of flexible material is provided with longitudinal rows of cuts parallel to the rotor axis and arranged in staggered relationship from one row to the next, and wherein each tooth is constituted by the cross-piece of a T-shaped blade the leg of which penetrates into one of said cuts and is bent at right angles at contact with the rotor rim.

17. A portable coating machine, according to claim 16, wherein the cross-pieces of the T-shaped blades arranged along the edge of the rotor are bent into helix sections in the direction of projection of the coating material.

18. A portable coating machine comprising, in combination, a hollow body acting as a reservoir for the coating material and having a cylindrical bottom wall forming the trough of said reservoir and a front wall with an aperture centered on the axis of said cylindrical trough, two hollow prehension arms parallel to the trough axis and secured on either side of said hollow body, two centrifugal superposed projection rotors the axes of which are at right angles to the trough axis, said rotors being rotatable in opposite directions and mounted on said body in front of said front wall for defining between them a gap at the level of the trough axis, a rotatable screw conveyor coaxial with, and housed within, said cylindrical trough for conveying the coating material from said trough to said gap, means for rotatably mounting said screw conveyor within said trough, a single transmission shaft housed within one of said hollow prehension arms, an electric motor incorporated in the machine and drivingly connected to said transmission shaft, means for drivingly connecting said transmission shaft to said screw conveyor and to both rotors, means for upwardly and downwardly limiting the spray of coating material from the rotors and which at the same time act as reclaimers, means for sifting and regulating the supply of coating material between the screw conveyor and the rotors, and means enabling the machine to be operated in the vertical position, when required.

19. A portable coating machine comprising, in combination, a hollow body acting as a reservoir for the coating material and having a cylindrical bottom wall forming the trough of said reservoir and a front wall with an aperture centered on the axis of said cylindrical trough, two hollow prehension arms parallel to the trough axis and secured on either side of said hollow body, two centrifugal superposed projection rotors the axes of which are at right angles to the trough axis, said rotors being rotatable in opposite directions and mounted on said body in front of said front wall for defining between them a gap at the level of the trough axis, a rotatable screw conveyor coaxial with, and housed within, said cylindrical trough for conveying the coating material from said trough to said gap, means for rotatably mounting said screw conveyor within said trough, a portable motor placed at a distance from the machine, a flexible drive connected to said motor, a single transmission shaft housed within one of said hollow prehension arms, a screwdriver-type driving tongue secured on said transmission shaft and connected to said flexible drive, means for drivingly connecting said transmission shaft to said screw conveyor and to both rotors, means for upwardly and downwardly limiting the spray of coating material from the rotors and which at the same time act as reclaimers, means for sifting and regulating the supply of coating material between the screw conveyor and the rotors, and means enabling the machine to be operated in the vertical position, when required.

20. A portable coating machine comprising, in combination, a hollow body acting as a reservoir for the coating material and having a cylindrical bottom wall forming the trough of said reservoir and a front wall with an aperture centered on the axis of said cylindrical trough, two hollow prehension arms parallel to the trough axis and secured on either side of said hollow body, two centrifugal superposed projection rotors the axes of which are at right angles to the trough axis, said rotors being rotatable in opposite directions and mounted on said body in front of said front wall for defining between them a gap at the level of the trough axis, a rotatable screw conveyor coaxial with, and housed within, said cylindrical trough for conveying the coating material from said trough to said gap, said screw conveyor having a central shaft, a metal strip formed in the shape of a helix at a distance from, and around, said shaft and the width of which increases from the end of said shaft opposite the rotors up to the other end of said shaft adjacent to the rotors, and radial arms securing said metal strip to said shaft, means for rotatably mounting said screw conveyor central shaft within said trough, a single transmission shaft housed within one of said hollow prehension arms, a motor means, means for drivingly connecting said motor means to said transmission shaft, means for drivingly connecting said transmission shaft to said screw conveyor central shaft and to both rotors, means for upwardly and downwardly limiting the spray of coating material from the rotors and which at the same time act as reclaimers, means for sifting and regulating the supply of coating material between the screw conveyor and the rotors, and means enabling the machine to be operated in the vertical position, when required.

21. A portable coating machine, according to claim 20, wherein the means for sifting and regulating the supply of coating material between the screw conveyor and the rotors comprises a safety grid interposed between the output of the screw conveyor and the rotors in front of the aperture of the front wall, and a central screen secured on said safety grid.

22. A portable coating machine, according to claim 21, wherein the central screen is circular and has a diameter substantially equal to that of the hollow part of the screw.

23. A portable coating machine comprising, in combination, a hollow body acting as a reservoir for the coating material and having a cylindrical bottom wall forming the trough of said reservoir and a front wall with an aperture centered on the axis of said cylindrical trough, two hollow prehension arms parallel to the trough axis and secured on either side of said hollow body; two centrifugal superposed projection rotors the axes of which are at right angles to the trough axis, said rotors being rotatable in opposite directions and mounted on said body in front of said front wall for defining between them a gap at the level of the trough axis; a rotatable screw conveyor coaxial with, and housed within, said cylindrical trough for conveying the coating material from said trough to said gap, said screw conveyor having a central shaft, a metal strip formed in the shape of a helix at a distance from, and around, said shaft and the width of which increases from the end of said shaft opposite the rotors up to the other end of said shaft adjacent to the rotors, and radial arms securing said metal strip to said shaft; a single transmission shaft housed within one of said hollow prehension arms, a motor means, means for drivingly connecting said motor means to said transmission shaft; means for drivingly connecting the rear part of said screw conveyor central shaft with said transmission shaft and carried by the body rear wall, an enclosure centered on the trough axis and disposed in front of the body front wall, transverse arms carrying said enclosure and hinged on the lateral walls of said body about a horizontal transverse axis, and a rubber block tight fitted into said enclosure and carrying the front part of said screw conveyor; a spiral wheel carried by said transmission shaft, and two spiral wheels at right angles to, and in meshing engagement with, said first spiral wheel and respectively fixed to said rotors; a roller rotatably mounted on the lateral walls of the body in front of the top rotor at a level below that of the axis of said rotor, a reduction unit carried by one of said lateral walls and interconnecting the transmission shaft and said roller so that the latter rotates in the opposite direction to the rotary direction of said top rotor, and a flexible transverse blade carried by the body, disposed between said top rotor and said roller and acting as a scraper for said roller; a transverse blade carried by the body in front of the bottom rotor, the upper edge of said transverse blade being at a level above that of the bottom rotor axis; a safety grid interposed between the output of the screw conveyor and the rotors in front of the aperture of the front wall, and a central screen secured on said safety grid; a removable semi-cylindrical cover to be inserted within the body and the diameter of which is substantially equal to that of the trough, a longitudinal handle secured on the top of said cover, and transverse and longitudinal rollers pivotally mounted on said cover and handle for facilitating the displacement of said cover into said body by rolling engagement with the lateral, front and rear walls of said body, whereby the machine may be operated in vertical position.

References Cited in the file of this patent

UNITED STATES PATENTS

| | | |
|---|---|---|
| 2,352,749 | Wills | July 4, 1944 |
| 2,380,499 | Brend | July 31, 1945 |
| 2,890,837 | Robertson et al. | June 16, 1959 |